United States Patent [19]

Lerner

[11] 3,965,653
[45] June 29, 1976

[54] PACKAGING APPARATUS

[76] Inventor: Bernard Lerner, Hudson, Ohio

[22] Filed: Feb. 28, 1973

[21] Appl. No.: 336,560

Related U.S. Application Data

[63] Continuation-in-part of Ser. No. 139,453, May 3, 1971, Pat. No. 3,815,318.

[52] U.S. Cl. .................................... 53/187; 53/373
[51] Int. Cl.² ...................... B65B 5/00; B65B 7/02; B65B 43/12; B65B 51/14
[58] Field of Search ......... 53/180 R, 180 M, 182 R, 53/182 M, 183, 187, 373; 156/583; 219/243

[56] References Cited
UNITED STATES PATENTS

| | | | |
|---|---|---|---|
| 2,837,883 | 6/1958 | Bracey | 53/182 M |
| 3,045,403 | 7/1962 | Mitchell | 53/182 X |
| 3,209,513 | 10/1965 | Cochrane | 53/182 |
| 3,273,307 | 9/1966 | Burt | 53/182 X |
| 3,473,288 | 10/1969 | Nakamura et al. | 53/182 X |
| 3,508,378 | 4/1970 | Fehr et al. | 53/180 |
| 3,551,260 | 12/1970 | Catherwood | 53/182 X |
| 3,564,810 | 2/1971 | Faletti et al. | 53/182 X |
| 3,597,587 | 8/1971 | Baum | 53/373 X |

Primary Examiner—Robert L. Spruill
Attorney, Agent, or Firm—Watts, Hoffmann, Fisher & Heinke Co.

[57] ABSTRACT

A packaging system wherein a web of interconnected heat-sealable bags are successively fed to a loading station where the bags are opened by an improved air flow system and loaded. An improved sealing and detaching assembly grips a loaded bag and isolates a region of the bag where a heat seal is to be formed from external forces thereby (1) permitting the formation of a heat seal in bag portions which are relaxed and, therefore, not subject to tearing or distorting, and (2) permitting the assembly to pivot relative to the web to tear off a loaded bag at the same time a heat seal is being formed on the bag. The assembly includes an improved resilient closure bar which, during a forward stroke of travel (1) engages one face of a loaded bag, (2) closes the bag, (3) clamps the opposite bag face against a pair of spaced gripper bars which isolate a region of the bag for heat sealing, and (4) brings the isolated region into contact with a heater bar to effect a heat seal. The gripper bars are spring mounted and biased to a position forward of the heater bar to effectively isolate a region of the bag for sealing prior to seal formation.

28 Claims, 4 Drawing Figures

PACKAGING APPARATUS

CROSS REFERENCE TO RELATED PATENTS AND APPLICATION

The present application is a continuation-in-part of parent application Ser. No. 139,453, filed May 3, 1971, entitled PACKAGING METHOD AND APPARATUS issued June 11, 1974 as U.S. Pat. No. 3,815,318 a division of which was filed Dec. 6, 1973 as Ser. No. 422,281.

Flexible Container Strips, U.S. Pat. No. 3,254,828 issued June 7, 1966 to Hershey Lerner. This patent will be referred to as the "Article Patent."

Mechanism for Automatically Feed, Loading and Sealing Bags, U.S. Pat. No. 3,477,196 issued Nov. 11, 1969 to Bernard Lerner. This patent will be referred to as the "Machine Patent."

BACKGROUND OF THE INVENTION

1. Field of the Invention

The present invention relates to packaging and more particularly to an improved packaging system for opening, loading, closing and sealing bag-like containers at a loading station and for isolating the force applied to a loaded container as it is severed from the remainder of the web along a preformed line of weakness.

2. Prior Art

The referenced Article and Machine Patents relate to the utilization of a packaging web comprising a chain of interconnected bags. The bags are each open on one face. The other face of each bag is connected to a contiguous bag along a preformed line of weakness.

The Article Patent describes a simple mechanism for dispensing, opening and loading the interconnected bags. A coiled web of interconnected bags is positioned on a mandrel in a carton. A blower is coupled to the carton to provide a positive pressure within the carton. The bags are fed, closed end first, through a slot in the carton. As the bags emerge from the carton, they are inflated by a relatively gentle flow of air emitted from the slot due to the positive pressure in the carton. A product is inserted in the inflated bag. The operator then moves the web until the next bag emerges from the carton and inflates, and also separates the loaded bag for a sealing operation.

The Machine Patent describes a machine for dispensing, loading, sealing, and severing the bags in sequential automatic operations. In addition, the machine is adapted to be connected to automatic counting and conveying equipment so that products being packaged are all automatically measured and deposited in the bags as the bags are fed to a load station. The Machine Patent also describes a system for providing an interrupted heat seal line whereby heavily loaded bags are no so weakened during the heat sealing operation that they tear along the sealing line.

These two described systems represent a system which is relatively simple, but slow, and a system which is relatively complex, but fast, for dispensing, loading and sealing bags. The optimized system for any given packager depends on a number of variables such as the size and nature of the products being packaged, the number of packages of any given product or group of products required, and the total number of packages, that is the total packaging rate, of the packager.

In the past, the most commonly used system for dispensing, separating and sealing bag-like containers has been basically manual. A machine similar in appearance to that shown in the Machine Patent has been the most commonly used. With this commercially successful arrangement, a web of bags is mounted on a mandrel within a housing. The web is fed through an exit slot near the top of the housing and then downwardly until an open bag is at a load station near the top of the machine and near the exit slot.

In use, the operator deposits the product to be packaged in the open bag at the load station. The operator then grasps the loaded bag, pulling it downwardly until the next bag is at the load station. The loaded bag is then manually severed and the open end is inserted between the jaws of a heat sealer provided near the base of the housing. The jaws are then actuated to close and effect a sealing of the bag. After a predetermined time interval, when a seal has been effected, the jaws will open allowing the bag to drop into a box or other receptacle beneath the machine.

The referenced parent application describes a novel packaging system for opening, loading, closing and sealing bag-like containers at a loading station. Relatively movable gripper and closure bars clamp a loaded container to isolate the forces applied in separating the loaded container from a web. The container can be heat sealed substantially concurrently with the separation. Alternatively, the loaded containers can be separated from the web without being sealed, or can be sealed without being separated from the web to produce a chain of interconnected loaded bags.

The apparatus described in the referenced parent application includes a heater bar and a sealing bar which are movable toward and away from each to clamp and heat seal a loaded container. A gripper bar is rigidly mounted above the heater bar. The gripper bar cooperates with the sealer bar to grip the packaging web in regions between the heat seal line and a preformed line of weakness in the web. The gripping bar isolates the heat seal line from forces applied to the web to sever the loaded container from the remainder of the web.

Another apparatus feature described in the referenced parent application is a tear-off mechanism for severing a loaded container from the remainder of the web serially along a preformed line of weakness from one side of the web to the other. The heater bar, the sealer bar and the gripper bar form part of a tear-off assembly which is pivotally mounted about an axis on one side of the web. The tear-off assembly is power driven to effect a sharp and rapid tear-off movement. This rapid tear-off movement not only serves to rapidly sever the loaded container from the remainder of the web but also serves to reduce the effective force imposed on the heat seal line by the weight of the product being packaged.

The heater bar described in the referenced parent application is a blunt edged member covered with TEFLON to prevent sticking. A spring biased stripper bar is provided to effect a positive removal of the sealed loaded packages from the heater bar.

Summary of the Invention

The present invention relates to an improved packaging system featuring an improved air flow system for opening bag-like containers at a load station and an improved closure and gripping assembly for isolating a region of the web from external forces.

In accordance with one feature of the present invention, an improved air flow system is provided for opening bag-like containers at a loading station. A tubular conduit is provided near the loading station to direct a narrow stream of high velocity pressurized air at a container as it arrives in the loading station. This high velocity air stream is preferably delivered in a brief burst of about one-tenth second in length and augments the conventional relatively gentle air flow current to assure that each and every bag is opened at the loading station. The high velocity air stream is concentrated in a limited area of the open end region of the container.

In accordance with another feature of the present invention, an improved closure and gripping system is provided including a pair of spring-mounted gripper bars which effectively isolate a web region between the gripper bars from external forces. These gripper bars can, in one application, be used to isolate a web region containing an easily opened tear-seal while the container is being severed from an interconnected web. In another application, the gripper bars can be positioned one on either side of a heater bar to isolate the region of the heat seal from forces on both sides of the heat seal. The gripper bars are preferably biased to a position forward of the heater bar thereby enabling them:

1. To isolate a region of the container prior to the time when heat sealing is begun; and,
2. To function as strippers to effect a positive removal of the sealed loaded container from the heater bar, whereby no additional stripping mechanism is required.

The apparatus of the referenced parent application has a single gripper bar secured adjacent the heater bar at a position above the heater bar. The gripper bar is provided with a finned heat dissipator to keep it cool. The present invention eliminates the need for the heat dissipator. One reason the gripper bars of the present invention do not become excessively heated is because they are not mounted immediately adjacent the heater bar, but rather are mounted on a movable carriage and are normally biased to a position forward of the heater bar.

Another reason the gripper bars do not become excessively heated is because a sheet of TEFLON is provided extending across the heater bar. The end regions of the TEFLON sheet are supported on rollers on opposite sides of the heater bar with an intermediate portion of the sheet extending across the heater bar. This sheet not only prevents containers being sealed from sticking to the heater bar but also serves to direct air which has been heated by the heater bar away from the region of operation of the gripper bars.

In order to assure proper operation of the apparatus of the referenced parent application, it is necessary to carefully position the single gripper bar relative to the heater bar. If the gripper bar extends too far forwardly of the heater bar, it will interfere with sealing. If the gripper bar does not extend forwardly of the heater bar by a proper amount, it will not effect a sufficient engagement with the web to isolate separation forces from the region of the seal. The present invention obviates the need for precise gripper bar positioning by spring mounting the gripper bars so that they are biased into engagement with the web approaches the heater bar. The gripper bars engage the web before the web reaches the heater bar, and then travel with the web as it approaches the heater bar.

Since the gripper bars are located substantially forwardly of the heater bar and make operative engagement with the web before the web is brought into contact with the heater bar, web severence along a preformed line of weakness can be initiated before seal formation has even begun. This permits a faster sequence of packaging operation.

The heater bar of the referenced parent application was preferably saw-cut or notched at spaced intervals along its length to provide an intermittent heat seal whereby minute unsealed regions along the seal retain their strength during the sealing operation to hold the web together. The present invention obviates the need for the formation of these notches in the heater bar. Since the dual gripper bars fully isolate the region of the heat seal from such external web forces as the weight of the contents within the bag, the seal is effected in a fully relaxed region of the web. The notched heater bar can, of course, still be optionally used as a safeguard to positively prevent web severance.

Accordingly, it is a general object of the present invention to provide a novel and improved packaging system.

Other objects and a fuller understanding of the invention may be had by referring to the following description and claims taken in conjunction with the accompanying drawings.

DESCRIPTION OF THE PREFERRED EMBODIMENT

Figure 1:
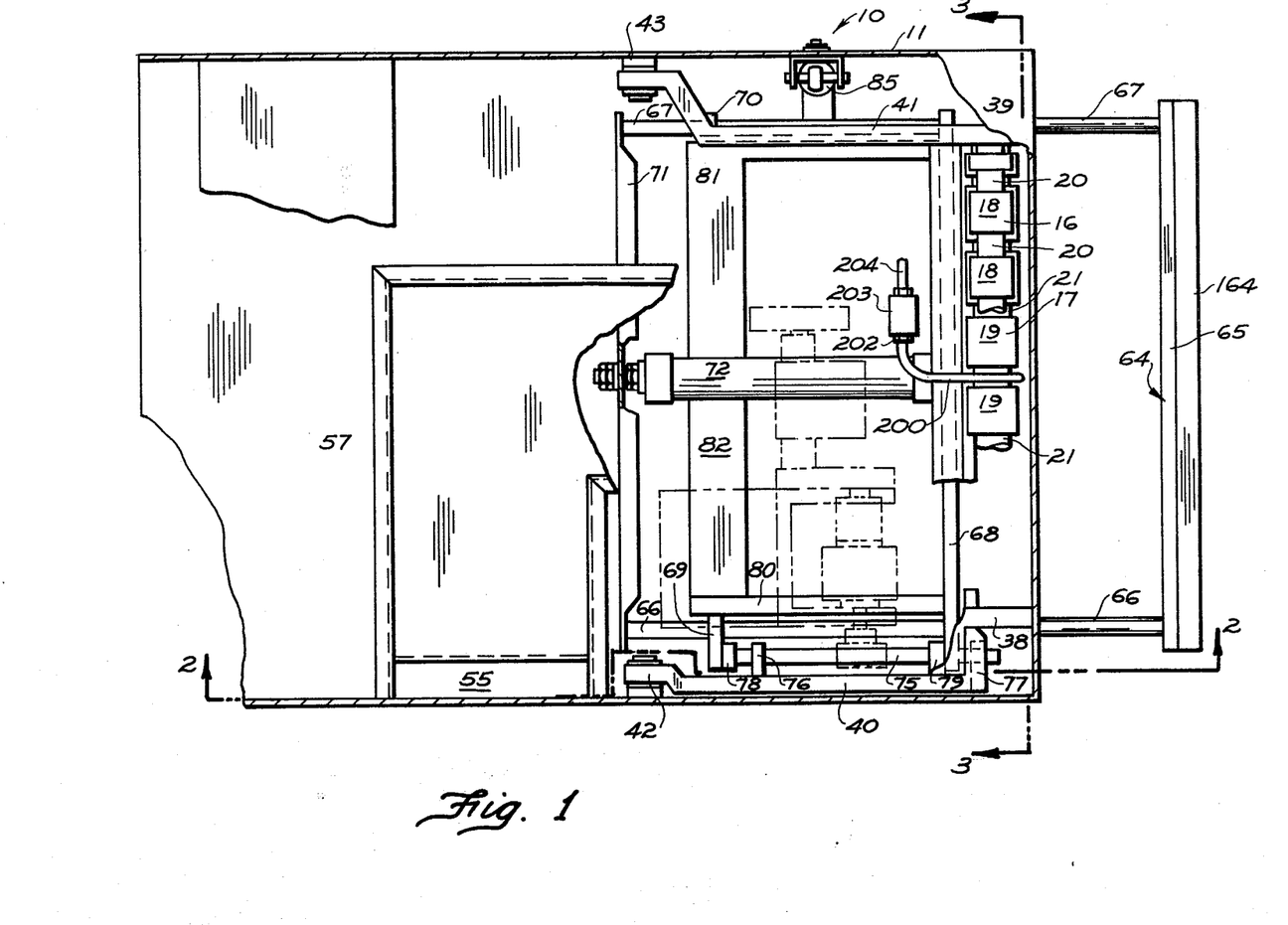
FIG. 1 is a top plan view of an automatic packaging machine constructed in accordance with the present invention.
Figure 2:
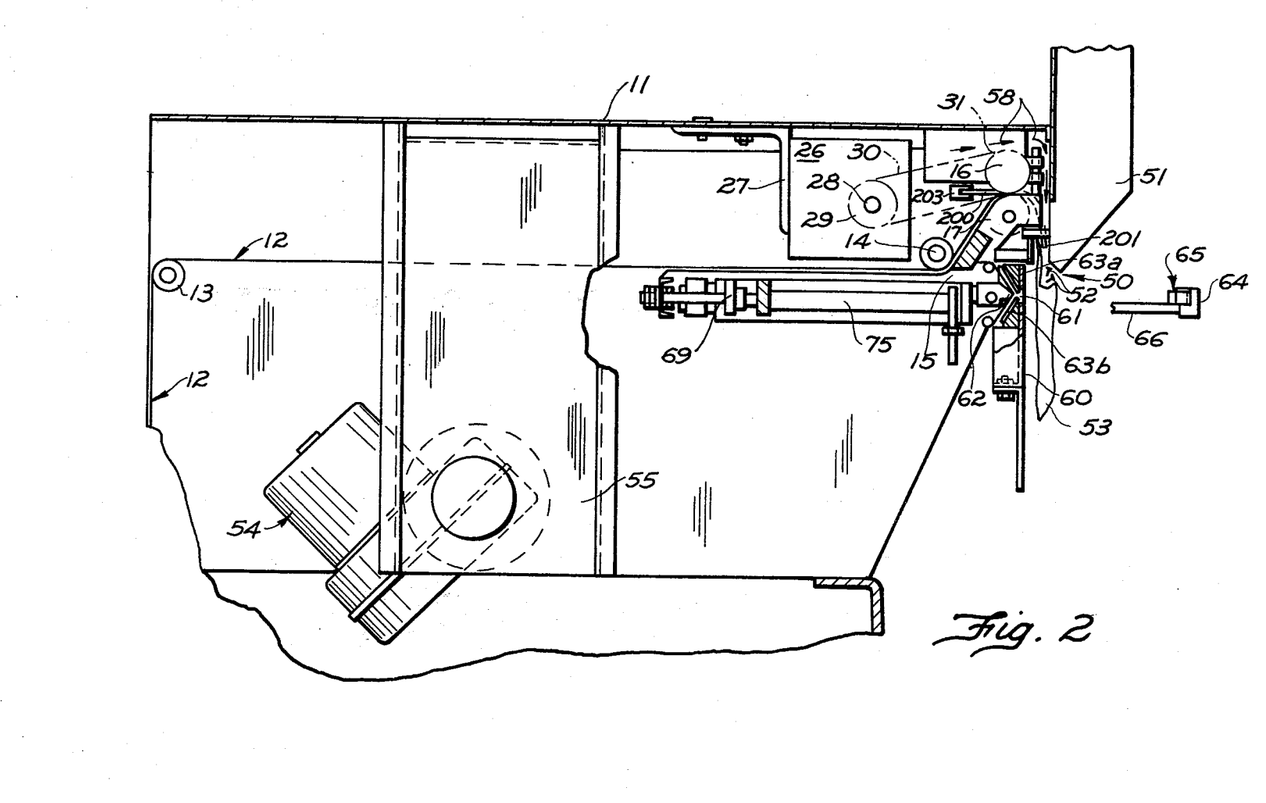
FIG. 2 is a sectional elevational view as seen from the plane indicated by the line 2—2 in FIG. 1.
Figure 3:
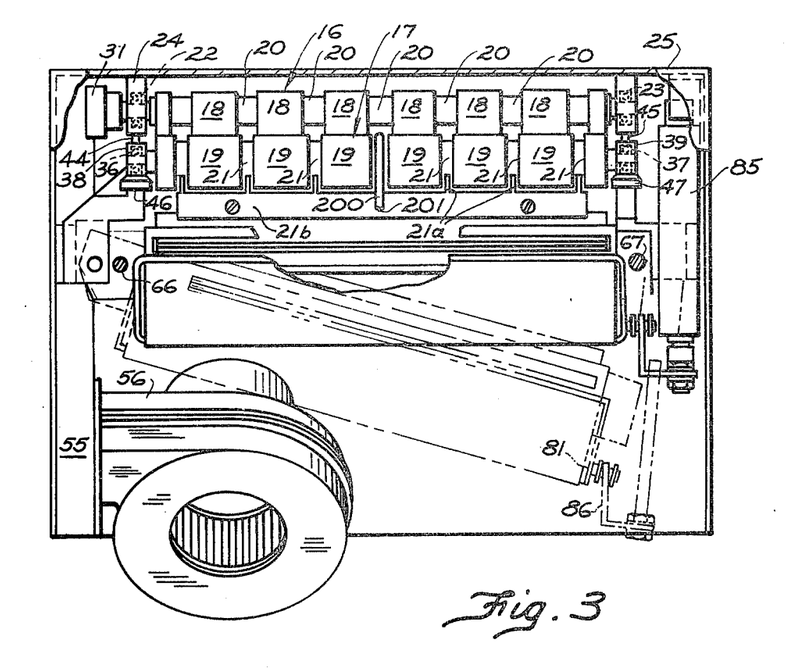
FIG. 3 is a sectional elevational view as seen from the plane indicated by the line 3—3 in FIG. 1.

Referring to FIGS. 1 to 3, a packaging machine constructed in accordance with the present invention is shown generally at 10. A pair of idler rolls 13, 14 are supported by the cabinet 11. A packaging web 12 of interconnected bag-like containers is fed vertically upwardly from a storage region, not shown, formed in the lower portion of the cabinet 11. The web 12 is reeved over the idler roller 13 and extends horizontally from the roller 13 to the roller 14. From the idler roller 14, the web 12 is directed forwardly and upwardly by a guide bar 15 toward a pair of feed rolls 16, 17.

The upper feed roll 16 is rotatably mounted within the cabinet 11 and is driven by a motor 26. A pair of bearings 22, 23 journal the feed roll 16 for rotation. A pair of brackets 24, 25 secured to the cabinet 11 support the bearings 22, 23. A bracket 27 mounts the motor 26 within the cabinet 11. The motor 26 has an output shaft 28. A drive pulley 29 is mounted on the output shaft 28. A driven pulley 31 is secured to the upper feed roll 16. A drive belt 30 is reeved around the pulleys 29, 31 to rotate the upper feed roll 16 concurrently with the output shaft 28.

The lower feed roll 17 is rotatably carried by a pair of arms 40, 41 which are pivotally mounted within the cabinet 11. A pair of bearings 36, 37 journal the feed roll 17 for rotation. A pair of brackets 38, 39 support the bearings 36, 37. The brackets 38, 39 comprise outer end regions of the arms 40, 41. The arms 40, 41 extend rearwardly from the region of the feed roll 17 and are pivotally mounted within the cabinet 11 by pivotal connections 42, 43.

The pivotal mounting of the arms 40, 41 permits the arms to be pivoted downwardly to separate the lower feed roll 17 from the upper feed roll 16 to facilitate feeding of the web 12 between the rolls 16, 17. A pair of threaded lock bolts 44,, 45 releasably secure the arms 40, 41 in their upper position where the feed rolls 16, 17 are in operative engagement with the web 12. The lock bolts 44, 45 extend through apertures formed in the brackets 38, 39 and into threaded apertures formed in the brackets 24, 25. The lock bolts 44, 45 are provided with knurled heads 46, 47 to facilitate their manual rotation.

Removal of the web 12 from the feed rolls 16, 17 during web feeding is facilitated by a series of reduced diameter portions 20, 21 which separate larger diameter feed roll portions 18, 19 one from another. Projecting fingers 21a formed integrally with a bar 21b extend into the reduced diameter portions 21 to strip the web 12 off the feed roll 17.

From the feed rolls 16, 17 the web 12 is fed downwardly along a substantially vertical path of travel to a loading station, indicated generally by the numeral 50 in FIGS. 2 and 3. A loading chute 51 is provided for discharging parts 52 into a bag 53 positioned in the loading station 50.

In order to open the container 53 when in the loading station, a blower indicated generally by the numeral 54 is provided within the cabinet 11. A vertically extending duct 55 connects with the blower output duct 56. The vertically extending duct 55 is disposed adjacent one side of the cabinet 11 and serves to duct air from the blower 54, which is disposed beneath the web 12, to the region above the web 12. A horizontally extending duct 57 connects with the vertically extending duct 55 and discharges air from the blower 54 into the region above the web 12. A relatively gentle flow of air is thereby caused to flow over the upper feed roll 16 and downwardly along the surface of the web 12, as indicated generally by the arrows 58. This gentle air flow is normally sufficient to separate the faces of a bag and open the bag. On occasion, however the bag faces may tend to adhere together. In accordance with one feature of the present invention, an auxiliary air flow system is provided to supply a brief burst of high velocity air to assure that the bag faces separate to permit opening of the bag by the described relatively gentle flow of air. The auxiliary air flow system includes a tubular conduit 200 of approximately ¼ inch inner diameter. The outer end 201 of the conduit 200 terminates above the loading station 50 to direct a high velocity burst of air toward the upper unsealed end of the bag positioned in the loading station. The inner end 202 of the conduit connects with a solenoid valve 203. A pressurized air conduit 204 supplies air to the valve 203. Electrical circuitry, not shown, is provided to energize and open the valve 203 deliver a burst of air of short duration, typically 1/10 second, initiate separation of the bag faces.

A sealing and detaching structure is provided for sealing a loaded bag and for separating the loaded bag from the web 12. To these ends, a substantially vertically extending guard bracket 60 is provided rearwardly of the path of travel of the web 12 adjacent the loading station 50. A slot 61 is provided in the guard bracket 60. A heater bar 62 is positioned within the region of the slot 61. A pair of gripper bars 63a, 63b, having forwardly facing edges 163a, 163b are positioned forwardly of the heater bar 62 along opposite sides of the slot 61.

The slotted guard bracket 60 serves a number of functions. First, it acts as a safety device to prevent injury to the fingers or hands of an operator by shielding the heater bar and the knife bar from contact. Second, it facilitates stripping of sealed containers from the heater bar and the sealer bar. Since the portion of the web being sealed must assume a generally U-shaped configuration upon insertion through the slot 61, the weight of the loaded bag will tend to pull the bag outwardly and away from the heater bar and sealer bar at the completion of the sealing operation.

Figure 4:
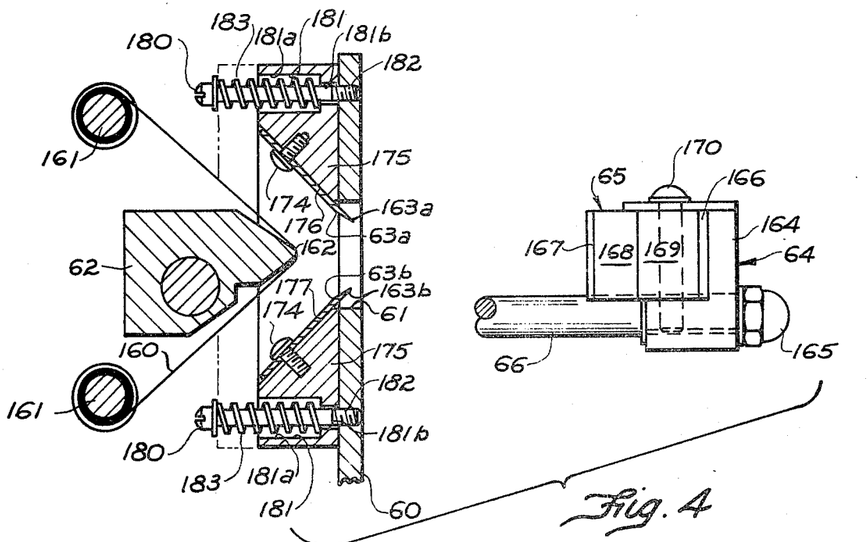
FIG. 4 is an enlarged sectional elevational view of a portion of the machine shown in FIG. 2.

Referring to FIG. 5, a carriage block 175 supports the gripper bars 63a, 63b. The carriage block 175 is rectangular in cross-section. A V-shaped slot extends through the block 175 defining upper and lower inclined surfaces 176, 177. Threaded fasteners 174 extend through apertures formed in the gripper bars 63a, 63b and into the carriage block 175 to rigidly secure the gripper bars 63a, 63b to the block 175.

The carriage block 175 is movably supported on the guard bracket 60. Threaded fasteners 180 extend through apertures 181 formed in the carriage block 175 and are threaded into apertures 182 formed in the guard bracket 60. The apertures 181 have enlarged inner end regions 181a which are of sufficiently large diameter to receive compression coil springs 183. The outer end regions 181b of the apertures 181 are of such diameter as will permit the carriage block 185 to slide freely along the fasteners 180.

The spring 183 bias the carriage block 185 forwardly toward a position of engagement with the guard bracket 60. Each of the springs 183 is positioned around a separate one of the fasteners 180. One end of each spring 183 engages the head of its respective fastener 180. The other end extends into the bore 181a and engages the block 175 in the region of transition between the enlarged bore 181a and the reduced diameter aperture region 181b.

The movable carriage block 175 serves to mount the gripper bars 63a, 63b for movement relative to the heater bar. The described spring-biased mounting system serves to bias the gripper bars toward a position forward of the heater bar 62. When the carriage block 185 is in engagement with the guard bracket 60, the outer edges 163a, 163b of the gripper bars protrude partially into the guard bracket slot 61. From this forwardmost position, the gripper bars 63a, 63b are movable rearwardly to a position wherein they are substantially aligned with the edge 162 of the heater bar 62. The gripper bar edges 163a, 163b are preferably pointed in cross-section, but may, instead be toothed along their length in the manner of a hacksaw blade. The upper gripper bar edge 163a preferably projects slightly forwardly of the lower gripper bar edge 163b to assure that the upper gripper bar effects a strong and secure grip on the web. The upper gripper bar 63a preferably penetrates the web slightly to assure a firm grip.

A closure bar 64 is provided for clamping the faces of the bag 53 into engagement with one another with the inner face in engagement with the heater bar 62 and the gripper bars 63a, 63b. A resilient pad 65 is carried by the closure bar 64 to perform this clamping function.

The closure bar 64 comprises a cross member 164 supported on a pair of rods 66, 67. The rods 66, 67 extend through apertures formed in the cross member 164 and are secured by nuts 165. The cross member 164 is L-shaped in cross-section, as best seen in FIG. 4, and defines an L-shaped recess 166.

The resilient pad 65 comprises a side-by-side assembly of forward, intermediate, and rearward members 167, 168, 169 which are adhered together by suitable adhesive. The forward member 167 is a relatively thin strip of silicone rubber which is sufficiently stiff to firmly press the faces of the bag 53 into engagement with the gripper bars 63a, 63b and the heater bar 62. The intermediate member 168 is a relatively thick, soft foam rubber strip which resiliently mounts the silicone strip 169. The foam rubber strip 168 not only serves to uniformly distribute the pressure exerted by the silicone strip 167 on the bag 53, but also serves as a safety device to prevent injury to an operator should his fingers be caught between the closure bar 64 and the guard 60. This rearward member 169 comprises a steel strip which is positioned in the L-shaped recess 166 and secured by fasteners 170 to the cross member 164. The fasteners 170 extend through apertures formed in the member 169 and are threaded into apertures formed in the cross member 164.

A significant advantage of the described resilient closure bar is its ability to conform to the shape of a warped gripper or heater bar, and its ability to compensate for unaligned gripper and heater bars. The resilient closure bar is thus quite tolerant of warped or misaligned heater and gripper bars and thereby significantly reduces machine down time to correct such problems.

The support rods 66, 67 movably mount the sealing bar 64 for movement toward and away from the heater bar 62 and the gripper bars 63a, 63b. A transversely extending bar 68 and a pair of apertured brackets 69, 70 slidably support the rods 66, 67. A transversely extending frame member 71 rigidly connects the inner ends of the rods 66, 67. The outward movement of the rods 66, 67 is limited by the engagement of the frame member 71 with the brackets 69, 70.

A pneumatic actuation system is provided to extend and retract the sealing bar 64. A pneumatic cylinder 72 is connected between the transversely extending bar 68 and the frame member 71. Extension of the pneumatic cylinder 72 effects rearward or inward movement of the sealing bar support assembly including the frame member 71 and the support rods 66, 67. When the pneumatic cylinder 72 is fully extended, the resilient pad 65 is clamped firmly against the heater bar 62 and the gripper bars 63a, 63b. Retraction of the pneumatic cylinder 72 effects forward or outward movement of the sealing bar assembly.

When the sealing bar 64 is in its outwardly extended position, the web 12 with its integrally formed container 53 extends between the support rods 66, 67. The container 53 is then solely supported by its connection to the web 12. When, however, the resilient pad 65 clamps both sides of the container 53 against the heater bar 62 and the gripper bars 63a, 63b, the container 53 is supported by this clamping action. The heater bar 62 then serves to heat seal the container 53 while the gripper bars 63a, 63b serve to isolate the region of the heat seal from such web forces as might otherwise cause a tearing of the web during heat seal formation.

Referring to FIG. 4, the heater bar 62 has a relatively sharp forwardly pointing sealing edge 162. A TEFLON sheet 160 is stretched across the edge 162. A pair of rollers 161 on opposite sides of the heater bar 62 support the sheet 160. Opposite end regions of the sheet 160 are coiled on the rollers 161 permitting used sheet portions to be reeled onto one of the rollers, and unused sheet portions to be reeled off the other one of the rollers 161. In addition to preventing containers being sealed from sticking to the heater bar, the TEFLON sheet 160 also serves to direct heated air currents away from the region of operation of the gripper bars 63a, 63b, to prevent their becoming excessively heated.

When relatively heavily loaded containers are being sealed, it may optionally be desirable to provide an interrupted seal whereby the web is not weakened across its entire width during the formation of the heat seal. This may readily be accomplished by providing the edge 162 of the heater bar 62 with saw cuts at spaced intervals along its length to prevent the transfer of a sufficient amount of heat to the web at spaced intervals to effect a continuous uniform heat seal.

The sealing and detaching assembly, including the heater bar 62, the grippers bars 63a, 63b, the sealing bar 64, and the pneumatic actuator 72 are all supported by a pivotally mounted frame structure. This frame structure includes a pair of side members 80, 81 connected at their rear ends by a transversely extending frame member 82, and at their front ends by the bar 68. This frame structure is pivotally movable about an axis located at the left side of the machine 10 as viewed in FIG. 3, and is movable between the up position shown in solid lines and the down position shown in broken lines.

Referring to FIG. 1, a pair of brackets 76, 77 are formed integrally with the arm 40. A shaft 75 is supported by the brackets 76, 77. A pair of collars 78, 79 are journaled on the shaft 75. The collar 78 is secured to a bracket 69 formed integrally with the frame side member 80. The collar 79 is secured to the bar 68.

As will be apparent, the frame assembly including the members 68, 80, 81, 82, is pivotally movable about the axis of the shaft 75. During movement of this frame assembly from the up to the down position illustrated in FIG. 3, a loaded container which is clamped between the gripper bars 63a, 63b and the sealing bar 64 is severed from the remainder of the web 12. The pivoting action stresses the web in such fashion as causes the web to sever serially along a preformed line of weakness from the right side to the left side of the web as viewed in FIG. 3.

A pneumatic system is provided to pivot the sealing and detaching assembly about the shaft 75. Referring to FIG. 3, a pneumatic cylinder 85 is secured at its upper end to the cabinet 11 and at its lower end to a bracket 86. The bracket 86 is connected to the side bar 81. When the cylinder 85 is extended, it pivots the sealing and detaching assembly downwardly, and when the cylinder 85 retracts, it pivots the sealing and detaching assembly upwardly.

The operation of the machine 10 as described above is quite similar to the operation of the system described in the referenced parent application and accordingly will not be described in great detail. Once a bag 53 is advanced to the loading station 50 and opened as illustrated in FIG. 2, parts 52 are discharged through the loading chute 51 into the open bag 53. The sealing bar 64 is then drawn inwardly to clamp both sides of the container 53 into engagement with the gripper bars 63a, 63b. Continued inward movement of the sealing bar 64 brings the sides of the container 53 into engagement with the heater bar 62. Once the container 53 has been engaged by the gripper bars 63a, 63b, the second actuator 85 is extended to pivot the sealing and detaching assembly about the shaft 75, to the dotted line position of FIG. 3. This pivotal movement imparts a tearing action to the web which severs the web along a preformed line of weakness above the region which is isolated by the gripper bars 63a, 63b.

Once a heat seal has been formed a bag tear off has been completed, the sealing bar 64 is retracted. The spring biased gripper bars 63a, 63b then serve to strip the sealed container 53 off the heater bar 62, permitting the container to drop into an awaiting receptacle or hopper (not shown).

The sealing and detaching assembly, with the sealing bar in its extended position, is then returned by the second actuator 85 to its sealing position. At the same time an electrical control means (not shown) operates the motor 26 to advance the web 12. As indicated previously this web advance can commence before the seal is completed and the pad 65 has been moved to release its clamping pressure. By this arrangement, another container is fed toward the loading station 50 prior to and simultaneously with the return movement of the sealing and detaching assembly. The container is then loaded and the sealing operation automatically repeated.

As will be appreciated, during the formation of a heat seal, the gripper bars 63a, 63b fully isolate the region of the heat seal from forces resulting both (1) from the weight of the parts 52 within the bag 53, and (2) from the tearing forces imparted during pivotal movement of the sealing and detaching assembly. Moreover, since the gripper bars are spring-biased into engagement with the web 12 before the web contacts the heater bar 62, the tear-off action can begin even before heat seal formation has been initiated.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A packaging apparatus comprising:
   a. structure establishing a path of travel for a packaging web to position a container forming portion of the web at a loading station; and
   b. container closure and gripping means for:
      i. closing a container portion after it has been loaded at the loading station;
      ii. gripping the loaded container portion to isolate a region of the web from forces applied to a loaded container portion both by container contents and to effect separation of the container portion from the web; and,
      iii. thereafter applying container separation forces to a line of weakness connecting a loaded container portion to the remainder of the web, said separation forces being applied to the line of weakness while the container portion is being gripped to isolate said region from said separation forces.

2. The packaging apparatus of claim 1 wherein said closure and gripping means includes a pair of spaced gripper bars and a closure bar movable toward and away from said gripper bars to clamp opposite sides of a container portion against said gripper bars to isolate a web region between said gripper bars from external forces.

3. The packaging apparatus of claim 2 wherein said closure bar includes forward, intermediate, and rearward portions, said forward portion comprising a strip of silicone rubber engageable with said gripper bars, said intermediate portion comprises a material which is substantially more resilient than said forward portion and which supports said forward portion, said rearward portion comprising a rigid structure supporting said intermediate portion.

4. The packaging apparatus of claim 1 wherein said closure and gripping means includes a pair of gripper bars disposed on opposite sides of a closure securing means to isolate a region of the web near said closure securing means from external forces to permit said closure securing means to secure said closure while said web region is in a relaxed condition.

5. The packaging apparatus of claim 4 wherein said closure securing means is shielded from contact by a guard bracket and said closure and gripping means includes a closure bar movably movably mounted for bringing the faces of a loaded container portion together between said closure securing means and said closure bar to permit securing of said closure by said closure securing means.

6. The packaging apparatus of claim 5 wherein said closure securing means comprise a heater bar positioned between said gripper bars.

7. The packaging apparatus of claim 4 wherein said gripper bars are disposed on opposite sides of said closure securing means.

8. The packaging apparatus of claim 7 wherein said gripper bars are mounted for movement toward and away from said closure securing means and are biased away from said closure securing means in a direction toward said closure means, whereby, movement of said closure means toward said gripper bars and toward said closure securing means will initially bring a loaded container portion into engagement with said gripper bars, whereafter subsequent continued movement of said closure means will effect concurrent movement of said container portion and said gripper bars toward said closure securing means.

9. The packaging apparatus of claim 8 wherein said closure securing means comprises a heater bar.

10. The packaging apparatus of claim 1 additionally including opening means for supplying a stream of relatively high velocity pressurized air to initiate opening of a container portion positioned in the loading station.

11. The packaging apparatus of claim 10 wherein said container opening means is adapted to supply a burst of pressurized high velocity air to initiate bag opening.

12. A packaging apparatus for heat sealing loaded containers at a sealing station, comprising:
   a. a pair of sealing members movable relatively toward each other to bring together and heat seal opposite faces of a loaded container positioned between the members;

b. a shield having a recess formed therein;

c. one of said members comprising a heater mounted inwardly of said recess and shielded therein d. a pair of gripper bars disposed on opposite sides of said heater; and e. the other of said members being operative during relative movement of the members toward one another to move at least a portion of a loaded container into said recess and into engagement with said gripper bars and with said heater, whereby said other member and said gripper bars serve to isolate the region of heat seal formation from external web forces during the formation of a heat seal.

13. The packaging apparatus of claim 12 wherein said gripper bars are movably mounted on a carriage and biased to a position near said recess whereby said gripper bars and said other member clamp said portion of a loaded container prior to the engagement of said portion with said heater.

14. The packaging apparatus of claim 13 wherein said gripper bars additionally serve to carry a sealed web away from the heater during the initial movement of said other member away from said heater, whereby the sealed web is prevented from sticking to the heater.

15. The packaging machine of claim 12 additionally including a pair of rolls disposed on opposite sides of said heater and a polytetrafluoreothylene sheet having opposite ends reeved around said rolls with an intermediate sheet portion extending across said heater in engagement therewith to prevent a sealed web from sticking to the heater bar.

16. The packaging machine of claim 15 wherein said sheet is arranged to direct air which has been heated by said heater away from the region of operation of said gripper bars to prevent their becoming excessively heated by said heater.

17. The packaging machine of claim 12 wherein said other member comprises a closure bar including a pad structure extending substantially the full width of the web in a direction transverse thereto and having a forward web engaging portion formed of silicone rubber, a rearward supporting structure formed of metal, and an intermediate cushion interposed between and adhered to said forward and said rearward portions and being substantially more resilient than said forward portion.

18. In a packaging machine of the type including structure establishing a path of travel for a web of container material and a feeding system for advancing the web along the path to successively position containers at a loading station, the improvement of a closure system for effecting closure of a loaded container, comprising:

a. a movably mounted assembly including gripper means, closure securing means and bar means, said bar means and said gripper means being relatively movable for clamping opposite sides of a loaded container to assure a closure thereof and to permit the securing of such closure by said closure securing means;

b. said gripper means and said bar means being operable together to engage the web on both sides of said closure securing means to isolate a web region near said closure securing means from forces exerted on the web outside said region; and, c. drive means for moving said assembly to sever a loaded container from the web along a web line of weakness located outside the isolated region.

19. The packaging machine of claim 18 wherein said gripper means comprises a pair of gripper bars disposed on opposite sides of said closure securing means and in alignment with said bar means to clamp opposite sides of a loaded container securely at positions on opposite sides of said closure securing means.

20. The packaging machine of claim 18 additionally including mounting means mounting said gripper means for movement toward and away from said closure securing means, and biasing means biasing said gripper means away from said closure securing means in a direction toward said bar means, whereby container closure movement of said bar means will initially bring the container into engagement with said gripper means thereby effecting force isolation of said web region prior to engagement of said web region by said closure securing means.

21. The packaging machine of claim 20 wherein said gripper means comprises a pair of gripper bars and said mounting means comprises a movably mounted carriage rigidly supporting said gripper bars on opposite sides of said closure securing means, said biasing means being operative to bias said carriage away from said closure securing means.

22. The packaging machine of claim 18 wherein said closure securing means comprises a heater for effecting a heat seal, and said bar means comprises a closure bar including a pad structure extending substantially the full width of the web in a direction transverse thereto and having a forward web engaging portion formed of silicone rubber, a rearward supporting structure formed of metal, and an intermediate cushion interposed between and adhered to said forward and said rearward portions and being substantially more resilient than said forward portion.

23. The packaging machine of claim 18 wherein said closure securing means comprises a heater bar extending substantially the full width of the web in a direction transverse thereto for effecting a heat seal, said gripper means comprises a pair of gripper bars disposed on opposite sides of said heater bar and extending therealong for substantially the full width of said web in directions parallel to said heater bar, said gripper bars being disposed in alignment with said bar means to clamp opposite sides of a loaded container securely on opposite sides of said heater means.

24. The packaging machine of claim 23 additionally including mounting means movably mounting said gripper bars for movement toward and away from said heater bar, and biasing means biasing said gripper bars away from said heater bar in a direction toward said bar means, whereby container closure movement of said bar means will initially bring the container into engagement with said gripper bars thereby effecting force isolation of said web region prior to engagement of said web region by said heater bar.

25. A packaging apparatus comprising:

a. a feed mechanism for feeding a packaging web along a path of travel to a work station to position a container forming portion of the web at the work station;

b. container engagement means for gripping a container portion at the work station at spaced positions and defining a container region between the positions;

c. said engagement means being operative when in use to support such container region for the performance of an operation on such region, and to isolate such region from undesired web stresses, occurring outside of such region;
d. operating means for performing an operation on such container region without severing such region while such region is supported and isolated by said container engagement means; and,
e. drive means for moving said container engagement means relative to said feed mechanism while such region is supported and isolated by said container engagement means to effect the severence of such container portion from the web at a location outside said region.

26. The packaging apparatus of claim 25 wherein said drive means is operable to pivot said container engagement means as an assembly to apply container separation forces serially along a line of weakness connecting the container portion to the web from a starting point on one end of the line.

27. A packaging apparatus comprising:
a. a feed mechanism for feeding a packaging web along a path of travel to a loading station to position a container forming portion of the web at the loading station;
b. container engagement means for engaging a loaded container portion while the container portion is at the loading station to close and grip the container portion;
c. said container engagement means including relatively movable members positioned on opposite sides of the loaded container portion and being relatively movable toward each other to engage and grip the loaded container portion at spaced locations to support a region for the performance of an operation on such region and to isolate such region from undesired stresses;
d. operating means for performing an operation on such region without severing such region while such region is supported and isolated by said container engagement means; and,
e. drive means for moving said container engagement means relative to said feed mechanism while such region is supported and isolated by said container engagement means to effect the severance of such container from the web at a location outside said region.

28. The packaging apparatus of claim 27 wherein said drive means is operable to pivot said container engagement means as an assembly to apply container separation forces serially along a line of weakness connecting the container to the web from a starting point on one end of the line.

* * * * *

UNITED STATES PATENT AND TRADEMARK OFFICE
CERTIFICATE OF CORRECTION

PATENT NO. : 3,965,653
DATED : June 29, 1976
INVENTOR(S) : Bernard Lerner

It is certified that error appears in the above-identified patent and that said Letters Patent are hereby corrected as shown below:

Item [73] has been omitted from the title page. The assignee of record is "Automated Packaging Systems, Inc., Twinsburg, Ohio, an Ohio corporation"

Col. 1, line 33, "alone" should be -- along --
Col. 3, line 65, after "web" and before "approaches" insert -- as the web --
Col. 5, line 9, after "44" delete one of the commas ","
Col. 5, line 60, after "203" insert -- to --
Col. 6, line 3, insert a space after "163b" (before "are")
Col. 6, line 17, delete "FIG. 5" substitute -- FIG. 4 --

Col. 6, line 60, insert a space after "163b" (before "to")
Col. 7, line 23, "This" should be -- The --
Col. 9, line 16, insert a space after "63b" (before "then")

Claim 6, line 2, "comprise" should be -- comprises --
Claim 10, line 2, after "including" insert -- container --
Claim 12, Col. 11, subparagraph c., line 2, after "therein" insert -- ; --

Signed and Sealed this

Twenty-first Day of December 1976

[SEAL]

Attest:

RUTH C. MASON
Attesting Officer

C. MARSHALL DANN
Commissioner of Patents and Trademarks